United States Patent
Hsu et al.

(10) Patent No.: US 11,632,288 B2
(45) Date of Patent: *Apr. 18, 2023

(54) DETERMINING THE IMPACT OF NETWORK EVENTS ON NETWORK APPLICATIONS

(71) Applicant: Arista Networks, Inc., Santa Clara, CA (US)

(72) Inventors: Fred Hsu, Sunnyvale, CA (US); Andre Pech, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,036

(22) Filed: Jun. 22, 2022

(65) Prior Publication Data
US 2022/0393934 A1 Dec. 8, 2022

Related U.S. Application Data
(63) Continuation of application No. 16/707,632, filed on Dec. 9, 2019, now Pat. No. 11,411,802.

(51) Int. Cl.
*H04L 41/0631* (2022.01)
*H04L 41/0654* (2022.01)
*H04L 41/12* (2022.01)
*H04L 41/147* (2022.01)
*H04L 41/16* (2022.01)

(52) U.S. Cl.
CPC ...... *H04L 41/0631* (2013.01); *H04L 41/0672* (2013.01); *H04L 41/12* (2013.01); *H04L 41/147* (2013.01); *H04L 41/16* (2013.01)

(58) Field of Classification Search
CPC . H04L 41/0631; H04L 41/0672; H04L 41/12; H04L 41/147; H04L 41/16; H04L 41/0654
See application file for complete search history.

(56) References Cited

U.S. PATENT DOCUMENTS

| | | | |
|---|---|---|---|
| 7,143,442 B2 | 11/2006 | Scarfe et al. | |
| 7,457,722 B1 | 11/2008 | Shain et al. | |
| 8,341,106 B1 | 12/2012 | Scolnicov et al. | |
| 9,269,040 B2 * | 2/2016 | Bader | G06N 3/02 |
| 9,350,601 B2 * | 5/2016 | Jain | H04L 41/0609 |
| 9,900,221 B2 * | 2/2018 | Hiscock | H04L 45/02 |

(Continued)

OTHER PUBLICATIONS

Related International Patent Application No. PCT/US2020/062366 mailed Mar. 16, 2022, 14 pages.

*Primary Examiner* — Sargon N Nano
(74) *Attorney, Agent, or Firm* — Fountainhead Law Group P.C.

(57) ABSTRACT

In some implementations, a method is provided. The method includes determining a physical topology of a network and monitoring network events based, at least in part, on control plane information received from one or more devices in the network. The method also includes monitoring the performance of each of a plurality of applications running on the network based, at least in part, on a set of application calls initiated by each application. When a drop in performance of an application is detected, the drop in performance is correlated with one or more of a plurality of detected network events to determine a cause of the drop in performance.

20 Claims, 6 Drawing Sheets

(56) References Cited

U.S. PATENT DOCUMENTS

| | | |
|---|---|---|
| 10,469,385 B2 * | 11/2019 | Heinz .................... H04L 47/15 |
| 10,523,554 B2 * | 12/2019 | Bugenhagen ....... H04M 7/0084 |
| 10,742,485 B2 * | 8/2020 | Racz .................. H04L 41/0631 |
| 11,088,929 B2 | 8/2021 | Kulshreshtha et al. |
| 2004/0103021 A1 | 5/2004 | Scarfe et al. |
| 2007/0174449 A1 | 7/2007 | Gupta |
| 2013/0325772 A1 * | 12/2013 | Bader ...................... G06N 3/02 706/20 |
| 2015/0365314 A1 * | 12/2015 | Hiscock .................. H04L 41/12 370/389 |
| 2016/0065419 A1 | 3/2016 | Szilagyi et al. |
| 2016/0157043 A1 * | 6/2016 | Li ........................... H04L 41/12 370/254 |
| 2018/0131613 A1 | 5/2018 | Fraser |
| 2018/0176095 A1 | 6/2018 | Diwakar |
| 2018/0190111 A1 | 7/2018 | Green et al. |
| 2018/0219743 A1 | 8/2018 | Garcia et al. |
| 2019/0123973 A1 | 4/2019 | Jeuk et al. |
| 2019/0166221 A1 | 5/2019 | Shimamura et al. |
| 2019/0173737 A1 | 6/2019 | Rácz et al. |
| 2019/0205172 A1 * | 7/2019 | Arolovitch .............. H04L 41/12 |
| 2019/0327130 A1 * | 10/2019 | Huang ................ H04L 41/0686 |
| 2020/0162371 A1 | 5/2020 | Musku et al. |
| 2021/0058376 A1 | 2/2021 | Teissonniere et al. |
| 2021/0067547 A1 | 3/2021 | Hale |
| 2021/0176114 A1 | 6/2021 | Hsu et al. |
| 2021/0306877 A1 | 9/2021 | Blake et al. |
| 2021/0367832 A1 | 11/2021 | Ramachandran et al. |

\* cited by examiner

DETERMINING THE IMPACT OF NETWORK EVENTS ON NETWORK APPLICATIONS

CROSS REFERENCE TO RELATED APPLICATIONS

This patent application is a Continuation of U.S. patent application Ser. No. 16/707,632, filed on Dec. 9, 2019, the content of which is incorporated herein by reference in its entirety for all purposes.

BACKGROUND

A network or data center may include a number of network devices (e.g., a computing device, an electronic device etc.) capable of communicating data with other devices through a wired or wireless connection or set of connections. For example, a network device may receive data from a first device (e.g., a first computing device, a first switch, a first router, etc.) and may forward the data to a second device (e.g., a second computing device, a second switch, a second router, etc.). A network device may have one or more applications running on it (e.g., development tools, inter-node communications, etc.) to perform various functions and tasks. Various events on the network (e.g., broken links, routing reconvergences) may impact the performance of such applications.

SUMMARY

In some implementations, a method is provided for improving the performance of network applications and network processing. The method includes determining a physical topology of a network and monitoring network events based, at least in part, on control plane information received from one or more devices in the network. The method also includes monitoring, for each of a plurality of applications running on the network, performance of the application based, at least in part, on a set of application calls initiated by the application. The method further includes detecting a drop in performance of an application running within the network. The drop in performance may be correlated with one or more of a plurality of detected network events to determine a cause of the drop in performance.

In some implementations, a network device is provided. The network device includes a persistent memory. The network device also includes a processing device coupled to the memory. The processing device is configured to determine a physical topology of a network and monitor network events based, at least in part, on control plane information received from one or more devices in the network. The processing device is also configured to monitor, for each of a plurality of applications running on the network, performance of the application based, at least in part, on a set of application calls initiated by the application. The processing device is further configured to detect a drop in performance of an application running within the network. The drop in performance may be correlated with one or more of a plurality of detected network events to determine a cause of the drop in performance. In response to detecting and determining the cause of s performance drop, remedial action(s) may be taken by the processing device to improve the performance of network processing and of the network application.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, a network may include a number of devices (e.g., a computing device, an electronic device, etc.) that may communicate data with other devices in the network (e.g., may receive data from a first device and may forward the data to a second device) as well as devices outside of the network. There are a number of network monitoring tools available to monitor the status of the network. Network monitoring tools allow for the detection of network events such as link congestion, link down, routing protocol reconvergence, configuration changes, and software upgrades, among others. However, such tools provide information about how devices in the network are connected, status and statistics of physical links, and monitoring data such as interface buffer queue length or hop-by-hop latency throughout the network. In addition, a number of tools exist to monitor the performance of applications running on the network. Such tools may obtain logs, as well as application trace/application call data from each application running on the network and monitor the health of each application. Such application monitoring tools allow for identification of performance issues in individual applications and may also point out specific parts of the application's flow that have been impacted. For example, an application monitoring tool may detect that a client request to a website was slower than expected, and that the underlying cause was a request from a backend server to an SQL database that took longer than expected to complete. However, the tools used for network and application monitoring are different, and have access to distinct sets of information. Thus, a network administrator monitoring the network status does not know whether there is an application suffering from a drop in performance and therefore cannot determine if a network event is having an impact on the performance of the application.

Figure 1A:
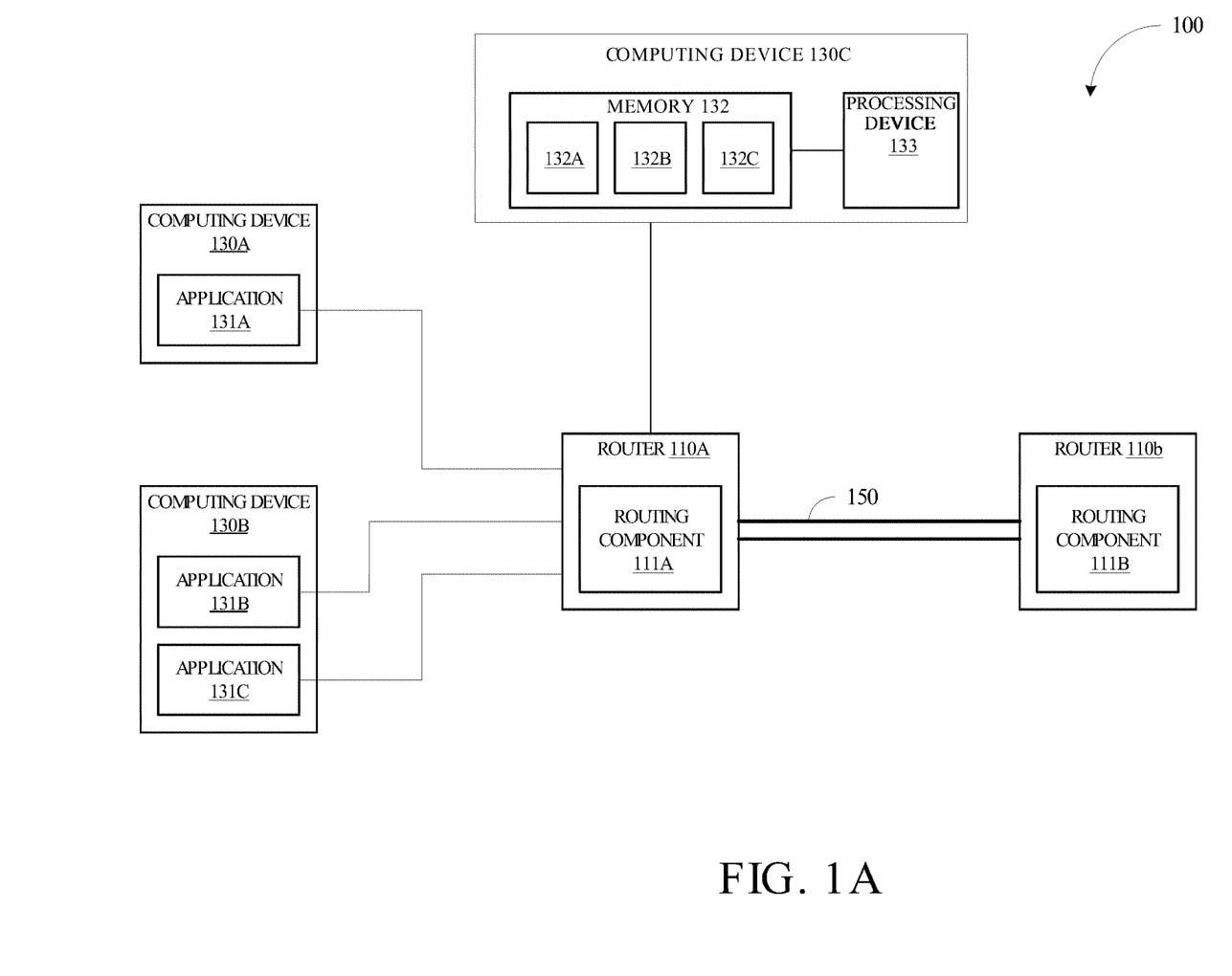
FIG. 1A is a block diagram illustrating an example of a network architecture, in accordance with some embodiments of the present disclosure.

FIG. 1A is a block diagram showing a network architecture 100 in accordance with some embodiments. The network architecture 100 includes a router 110a, a router 110b, and computing devices 130A-C. The router 110a includes a routing component 111a and the router 110b includes a routing component 111b. Computing devices 130A and B may each include one or more applications 131A-C. A computing device 130 and/or an application 131 of the computing device 130 may transmit data (e.g., messages, frames, packets, etc.) to other devices (e.g., other computing devices 130) via routers 110a and 110b, and/or may receive data from other devices via routers 110a and 110b. Although described with respect to routers 110a and 110b, in some embodiments the computing device 130 may transmit data to other devices (e.g., other computing device 130) via switches (e.g., routers 110a and 110b may instead be switches 110a and 110b). Each computing device 130 may be coupled to the router 110a via one or more networks (not illustrated in FIG. 1). The router 110a may be coupled to the router 110b via a communication channel 150 and the communication channel 150 may traverse (e.g., go through or use) one or more networks (also not illustrated in FIG. 1). A network may be a public network (e.g., the internet), a private network (e.g., a local area network (LAN) or wide area network (WAN)), or a combination thereof. A network may also include a wired or a wireless infrastructure, which may be provided by one or more wireless communications systems, such as a WiFi hotspot connected with the network and/or a wireless carrier system that can be implemented using various data processing equipment, communication towers (e.g. cell towers), etc. A network may also include various network devices such as switches, routers, bridges, gateways, servers computers, cables, chips integrated circuits, etc.

In one embodiment, each computing device 130 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 130 may comprise any suitable type of computing device or machine that has a programmable processor including, for example, server computers, desktop computers, laptop computers, tablet computers, smartphones, set-top boxes, etc. In some examples, the computing devices 130 may be a single machine or may include multiple interconnected machines (e.g., multiple computers configured in a cluster). In another embodiment, one or more of computing devices 130 may be a virtual machine (VM). A VM may be an emulation of a computing device. The VM may execute on a hypervisor which executes on top of an operating system for a host computing device. The hypervisor may manage system sources (e.g., may manage access to hardware devices, such as processors, memories, storage devices, etc., of the host computing device). The hypervisor may also emulate the hardware (or other physical resources) which may be used by the VMs to execute software and/or applications. As illustrated in FIG. 1A, computing devices 130A and B may each include one or more applications 131. An application 131 may be a program (e.g., a computer program), software, etc., that may execute on a computing device 130 to perform various functions, tasks, operations, etc. Applications 131 may be any application that uses network tracing, such as micro-services applications, inter-node communication applications and development tools among others. Examples of applications 131 include, but are not limited to, a messaging application, a video application, a social networking application, a video sharing application, a photo sharing application, a chat application, a content (e.g., video, music, etc.) delivery application, a web browser, a media player, a gaming application (e.g., a video game), etc.

As discussed above, the computing devices 130 and/or the applications 131 may transmit packets to and/or receive packets from other devices and/or applications via the routers 110a and router 110b. The router 110a may transmit data to and/or receive data from the router 110b via a communication channel 150. In one embodiment, the communication channel 150 may be an encrypted communication channel. An encrypted communication channel may be a channel where portions or all of the data (e.g., portions or all of the messages, packets, frames, etc.) that are transmitted/received via the channel, are encrypted. An encrypted communication channel may also be referred to as a secure communication channel. Encrypting portions or all of the data (e.g., packets) communicated via the communication channel 150 may increase or improve the security of the communication channel. Examples of encrypted communication channels include, but are not limited to, Internet Protocol Security (IPsec) channels, Transport Layer Security (TLS) channels, Secure Shell (SSH) channels, Virtual Private Network (VPN) channels, etc.

A packet (or message, frame, etc.) may include multiple portions. For example, a packet may include a packet header (also referred to as a header), a packet footer (also referred to as a footer) and a payload. The packet header may include information such as a source address and a destination address. A source address may be data (e.g., a value, a number, etc.) that may indicate the sender of the packet. For example, a source address may be an Internet Protocol (IP) address of a computing device 130 that transmitted the packet. A destination address may be data (e.g., a value, a number, etc.) that may indicate a recipient of the packet. For example, a destination address may be an Internet Protocol (IP) address of a receiving computing device. The packet header may also include information such as a source port and a destination port.

In one embodiment, a network device (such as a router or a switch) may include multiple processing cores or may have access to multiple processing cores (e.g., may be able to use multiple processing cores for processing packets). A processing core may refer to separate processing devices (e.g., separate central processing units (CPUs), separate processors, etc.) or may refer to a single core of a processing device that has multiple cores (e.g., a single core of a multi-core CPU). It may be beneficial for the network device to use multiple processing cores for processing packets rather than a single processing core. For example, if flows (e.g., groups, streams, sets, etc.) of packets are received from each of the three applications 131 illustrated in FIG. 1A, the network device would be able to process the different flows of packets more quickly if a different processing core was used to process each flow of packets. This may allow the network device to process the three flows of packets simultaneously using three different processing cores (which decreases the amount of time it takes the networking device to process the three flows of packets). This may also allow the network device to parallelize the processing of the flows of packets. Various techniques such as receive side scaling (RSS) and receive packet steering (RPS) may be used to distribute packets (received by a networking device) to different processors and/or processing cores. Generally, these techniques (e.g., RSS, RPS, etc.) use the source address of packets to determine how to distribute the packets among the different processors and/or processing cores.

As discussed above, portions or all of a packet (or message, frame, etc.) transmitted via the communication channel 150 may be encrypted to increase the security of the communication channel 150. For example, if the communication channel 150 is an IPsec channel, the IP packets (e.g., header, payload, and footer) that are transmitted using the IPsec channel may be encrypted to generate IPsec packets (e.g., to generate encrypted packets). The router 110a may encrypt the IP packet (to generate the IPsec packets) and may send the IPsec packets to the router 110b via the communication channel 150. The IPsec packet may also include its own header, footer, and payload. The payload of the IPsec packet may be the encrypted IP packet. The header of the IPsec packet may also include a source address that indicates the sender of the IPsec packet. For example, the IPsec packet may indicate that the IPsec packet is from the router 110a by including the IP address of the router 110a in the source address of the IPsec packet.

As discussed above, a packet may be encrypted by the router 110a to generate an encrypted packet. The packet may include a first header with a first source address and the encrypted packet may include a second header with a second source address identifying the router 110a (e.g., an IP address of the router 110a). Encrypting the packet and/or the packet header may prevent router 110b from reading the first source address that is in the packet header because the first source address is encrypted when the packet or packet header is encrypted. If the router 110b is unable to read the first source address of the packets, the router 110b may be unable to determine which processing core should be used to process the packets based on the first source address (and thus may be unable to use techniques such as RSS and/or RPS). Instead, the router 110b may use the second source address of the encrypted packet. However, because all of the encrypted packets may be encrypted by router 110a, the encrypted packets will include the same second source address (e.g., the IP address of the router 110a). This may cause the router 110b to provide, route, forward, etc., all of the encrypted packets (generated by the router 110a) to the same processing core. Routing the encrypted packets to the same processing core (rather than multiple processing cores) will increase the amount of time for the router 110b to process the encrypted packets (e.g., decrypt the encrypted packets, determine where the unencrypted packets should be forwarded to, etc.).

In one embodiment, the routing component 111b (of the router 110a) may encapsulate the encrypted packets within another packet, which may be referred to as an outer packet or an encapsulating packet. The packet header of the outer/encapsulating packet may include a routing value based on the source address (and/or other fields/values such as the source port, the destination address, the destination port, the payload, etc.) of the unencrypted packet (e.g., the packet that was encrypted to generate the encrypted packet). For example, the packet header may include a source port and the source port may include the routing value. The routing value may be determined (e.g., generated, calculated, etc.) by the routing component 111b. For example, the routing value may be a hash (e.g., a hash value) generated based on the source address of the unencrypted packet. As discussed above, the source address of the unencrypted packet may (which would allow the router 110b to assign different flows of packets to different processing cores, based on the source addresses) may not usable because the source address may be encrypted when the unencrypted packet is encrypted by the router 110a. However, because the source port of the encapsulating packet is a routing value based on the source address of the unencrypted packet, this may allow the router 110b to assign the different flows of packets to different processing cores based on the source port, as discussed in more detail below. Although the present disclosure may refer to a source port, other fields, parameters and/or values in the packet headers may be used to store the routing value in other embodiments. In addition, other portions of the unencrypted packet may be used to determine, generate, calculate, etc., the routing value in other embodiments. For example one or more of the source address, the source port, the destination address, the destination port, and the payload (or portions of the payload) of the unencrypted packet may be used to generate the routing value.

In one embodiment, the router 111b (of the router 110b) may receive an encapsulating packet (e.g., outer packet) generated by the router 110a and may determine which processing core should be used to process the encapsulating packet (and the encrypted packet within the encapsulating packet) based on the source port of the encapsulating packet. As discussed above, the source port of the encapsulating packet may be a routing value based on the source address of the encrypted packet within the encapsulating packet.

Although the present disclosure may refer to IPsec, IPsec packets, IPsec channels, etc., other embodiments may use other secure communication channels and other types of packets. For example, TLS channels/connections, virtual private network (VPN) channels/connections, virtual extensible LAN (VXLAN) channels/connections, etc., may be used. In addition, while the present disclosure may refer to and/or illustrate routers, the embodiments are not meant to be limiting, as other types of network devices such as a switch, a gateway, a bridge, etc., may perform the methods, functions, operations, etc., described herein. Furthermore, although three computing devices 130A-C and three applications 131A-C are illustrated in FIG. 1A, it shall be understood that in other embodiments, any number of computing devices and/or applications may be used in the network architecture 100.

Computing device 130C may include memory 132 and processing device 133. Memory 132 may further include an application monitoring software module 132A (hereinafter module 132A), a network monitoring software module 132B (hereinafter module 132B), and a data correlation software module 132C (hereinafter module 132C). Although illustrated as software modules stored in memory 132, modules 132A-C may be implemented as firmware in processing device 133. In some embodiments, these software modules may be separate from the processing device 133 (e.g., may be a separate circuit, field programmable gate array (FPGA), application specific integrated circuit (ASIC), a process running on another processing device, etc.)

Module 132A may be any appropriate software that can pull application performance data for each of applications 131 from the router 110A and save this data in memory 132. More specifically, module 132A may obtain data logs and application calls initiated by each of applications 131. Each application call may indicate the amount of time taken for that call to complete and include beginning and end time stamps as well as IP addresses of the source and destination device for that call. In some embodiments, each time a request for data is made by an application 131, module 132A may analyze each of the application calls required to complete the request, and obtain a call graph, as discussed in further detail herein. As used herein, a request may itself be an application call that refers to an overarching request for data and involves a number of application calls (or stated different, sub-application calls) to complete the request. Module 132A may specify criteria regarding the amount of time required for each application call in the graph to complete as well as the time taken for the request as a whole to complete. In addition, module 132A may determine internet protocol (IP) addresses of the source and destination devices for the request and each related application call. For example, application 131C may issue a request to view a web page hosted on computing device 130A, which may involve a series of application calls. Application 131C may issue a first application call to application 131B, which may issue a second application call to application 131A to obtain the web page data. Application 131A may send a third application call to a web data storage database (not shown) to retrieve the requested web page data and may then transmit the data back to application 131C, thus completing the request. Module 132A may obtain each application call, and each application call may indicate the time taken for it to complete, while the request may indicate the time taken for the web page request as a whole to be completed. Module 132A may also obtain the beginning and end time stamps for each application call as well as the IP addresses of the source and destination devices for each application call. The first application call will have a source and destination IP address matching the computing device 130B. Meanwhile, the second application call will have a source IP address of computing device 130B and a destination IP address of computing device 130A. Module 132C may use this data to determine the segment within the network topology where data flow for each application is processed, as discussed in further detail herein.

Module 132B may function to build a full physical topology of the network 100 and monitor, collect and analyze network states (e.g., network events) from all over network 100. Module 132B may perform these functions based on control and management plane data obtained from router 110A, for example. Module 132B may be any appropriate network monitoring software. Module 132B may monitor and detect network events such as link congestion, link unavailability, link errors, routing protocol reconvergence, configuration changes, and software upgrades, among others.

Figure 1B:
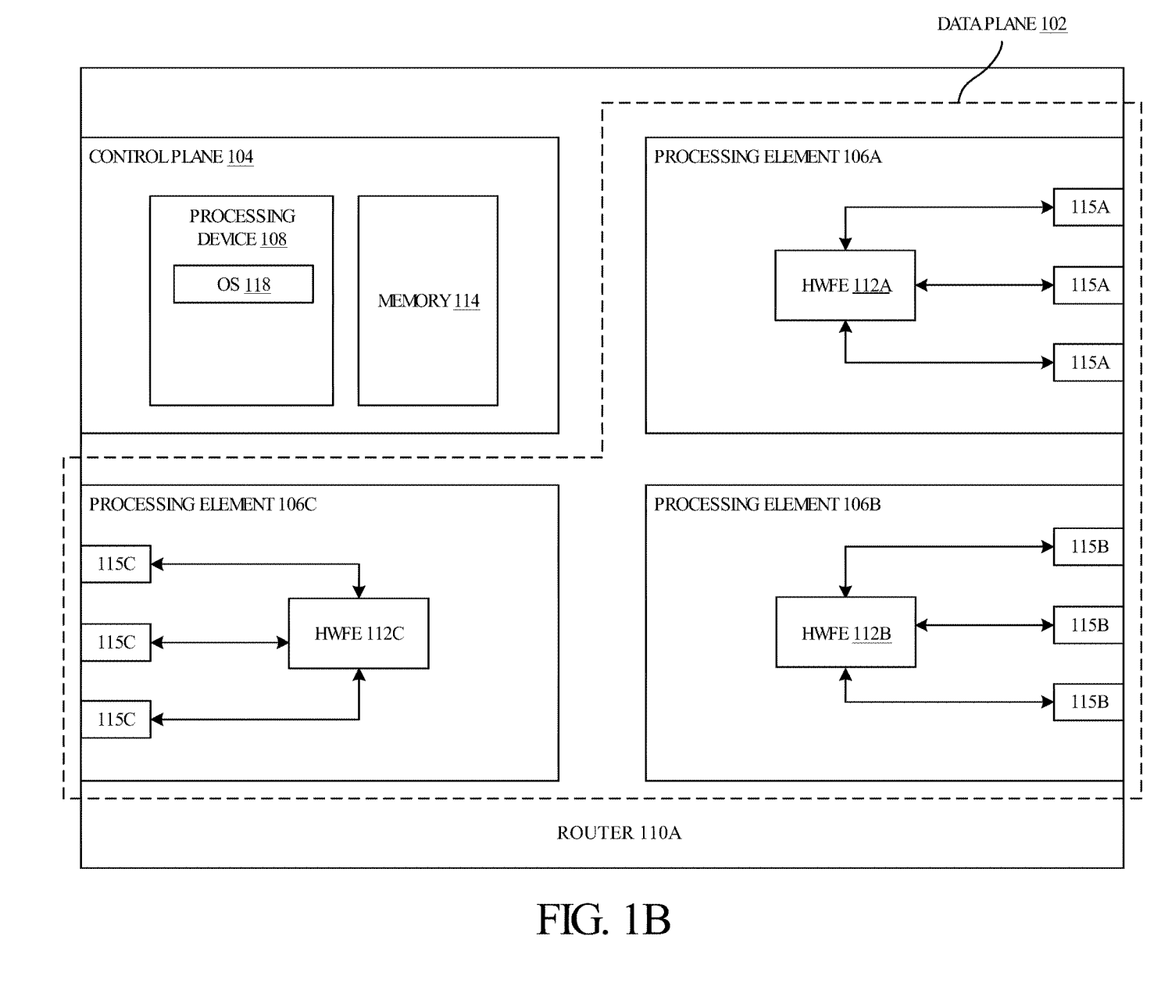
FIG. 1B is a block diagram illustrating an example of a network device, in accordance with some embodiments of the present disclosure.

FIG. 1B is a block diagram of one embodiment of router 110A illustrated in FIG. 1A. Router 110A may include a control plane 104 and a data plane 102. In one embodiment, the data plane 102 receives, processes, and forwards network data using various configuration data (e.g., packet forwarding (routing, switching, or another type of packet forwarding), security, quality of service (QoS), and other network traffic processing information). For example, for each received packet of the network traffic, the data plane 102 determines a destination address of that packet, looks up the requisite information for that destination in one or more memories of data plane 102, and forwards the packet out the proper outgoing interface. The data plane 102 includes multiple data processing elements 106A-C that can each receive, process, and/or forward network traffic. In one embodiment, each data processing element 106A-C includes a hardware forwarding engine (HWFE) 112A-C and ports 115A-C, respectively.

In one embodiment, the control plane 104 includes a processing device 108 (e.g., a central processing unit (CPU)) and a memory 114. As discussed herein, processing device 108 is interchangeably referred to as a control plane processor of router 110A. The processing device 108 is used to process information for the control plane 104 and write configuration data for hardware forwarding engines 112A-C in the data processing elements 106A-C. The information processed by processing device 108 includes, for example, control plane data corresponding to a plurality of different classes of control plane traffic, such as routing protocol messages, routing table messages, routing decisions messages, route update messages, unresolved traffic messages, L2 protocol messages, link aggregation control protocol messages, link layer state update messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network device), messages for routing table misses, time control messages (e.g., precision time protocol messages), messages for packets marked as being of interest for snooping (e.g., access control list logging and port mirroring messages), messages used to collect traffic diagnostics and congestion indicators, address resolution messages (ARP) requests and replies, neighbor solicitation requests and replies, general communication to the control plane of the networking device, etc. Processing device 108 processes the control plane network data to perform control management updates and/or respond with control message responses (e.g., routing decisions, protocol updates, traffic resolutions, etc.). Processing device 108 further functions to transmit control plane data to module 132B of computing device 130C (shown in FIG. 1A) in response to requests for such data.

In one embodiment, the processing device 108 includes an operating system (OS) 118 which is executing various processes. In this embodiment, the processes execute various aspects of the functionality of the control plane 104. For example, the processes may be used for quality of service, access control lists management (or other types of security), policy service, etc. Other examples of processes may include a fan agent, a light emitting diode agent, a temperature sensor agent, a database service, management service(s), processes to support networking protocols (e.g., spanning tree protocol (STP), routing protocols (e.g., such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol), Multiprotocol Label Switching (MPLS), and/or other types of networking protocols), network flow management applications (e.g., openflow, directflow), process manager, and/or other types of processes for other types of functionality of the network device 100.

In one embodiment, for each received unit of network data (e.g., a packet), the data plane 102 determines a destination address for the network data, looks up the requisite information for that destination in one or more tables stored in the data plane, and forwards the data out the proper outgoing interface, for example, one of the data processing elements 106A-C. In one embodiment, each of data processing elements 106A-C includes one or more hardware forwarding engines (HWFE(s)) 112A-C and ports 115A-C, respectively. Each hardware forwarding engine 112A-C forwards data for the network device 100, such as performing routing, switching, or other types of network forwarding or processing.

In one embodiment, the network device 100 may be any type of device that can communicate network data with another device (e.g., a personal computer, laptop, server, mobile device, a phone, a smartphone, a personal gaming device, another network device, switch, router, hub, bridge, gateway, etc.). For example, the network device 100 may receive data from a first device and may forward the data to another device, and vice versa. In one embodiment, the network device 100 may be a virtual machine or a container. The network device 100 may also be a device that hosts one or more virtual machines and/or containers.

Referring back to FIG. 1A, module 132C may function to map the application performance data collected by module 132A to the physical topology of the network generated by 132B. In this way, module 132C may provide an indication of where in the network the data flow for a particular application is processed. For example, based on the IP addresses of a source and destination device for a request and each related application call, module 132C may indicate a segment of the network including one or more devices (nodes) where the data flow for the requesting application is processed. Module 132C may also indicate which devices/nodes each application call in a particular request are processed by (e.g., a source and destination device of each application call), thereby providing a fine-grained level of specificity when mapping a request and its related application calls to the physical topology of the network. In addition, module 132C may record the beginning and end time stamps for the request and each related application call. Module 132A may specify criteria regarding the length of time required for a request and each related application call to complete. In some embodiments, the criteria may be adjusted based on hop-by-hop latency of the network, as discussed in further detail herein. Thus, if a request or application call takes longer than specified by the criteria, this may correspond to a drop in performance. In some embodiments, the criteria may also include a maximum number of retries allowed by a request and each related application call. If a request or application call retries more than the maximum number of retries, this may also correspond to a drop in performance. Module 132C may store the mapped application performance and network topology data in memory 132. Upon a drop in performance of an application being detected, module 132C may identify the segment of the network where the data flow for that application is processed, and identify the particular devices/nodes associated with the application call(s) corresponding to the drop in performance (e.g., the application call(s) that took longer than it should have based on criteria specified by module 132A). In some embodiments, the drop in performance of an application may refer to a drop that occurred previously and is detected from the stored application performance and network topology data. As discussed in further detail herein, module 132C may determine a plurality of network events occurring on the identified segment and/or nodes and identify one or more of those events as causes of the drop in performance. In some embodiments, module 132C may identify as a cause, network events occurring on those nodes/devices having a time stamp that is a threshold amount of time before the beginning time stamp of the application call(s) corresponding to the drop in performance.

Figure 2A:
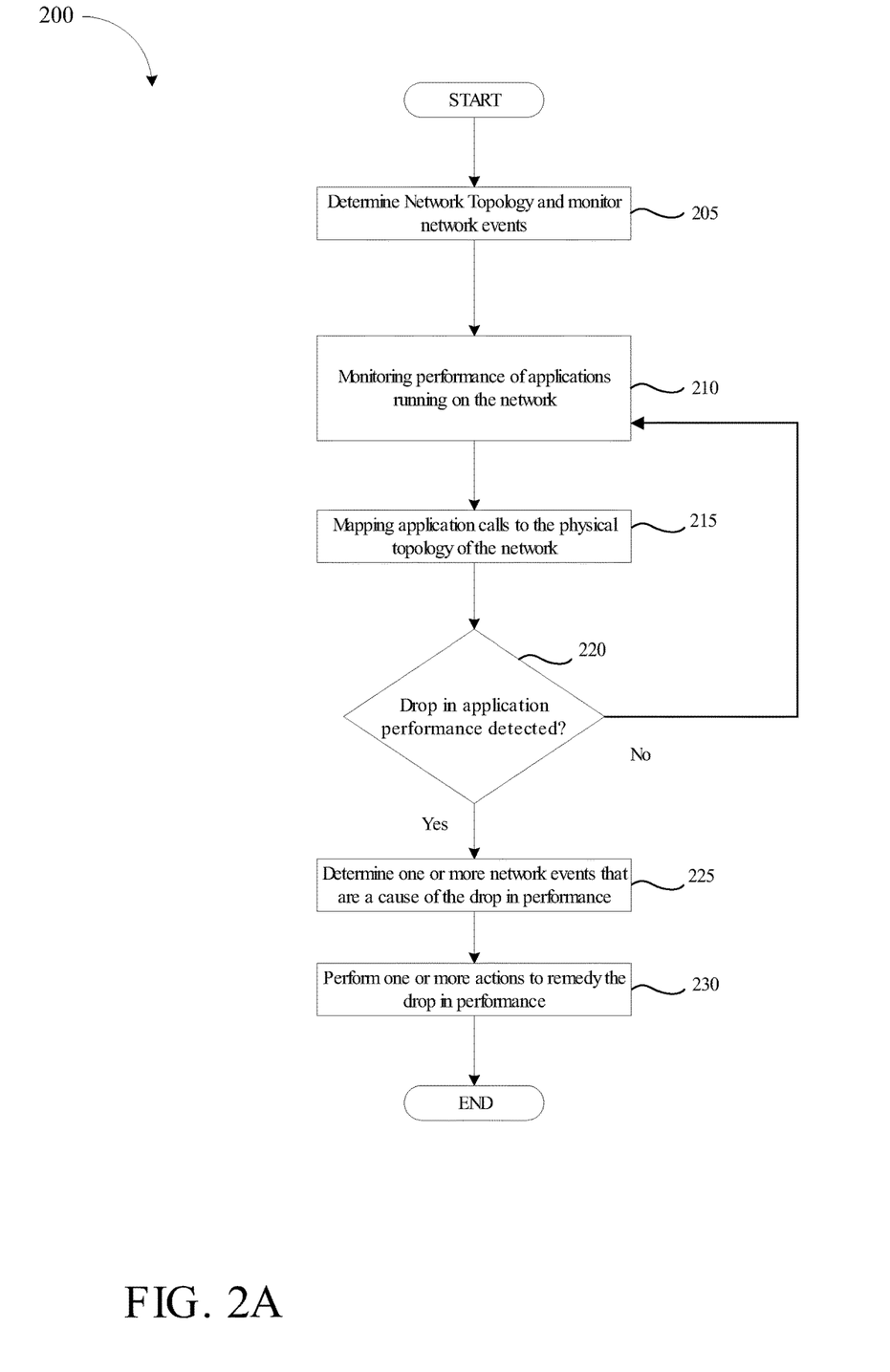
FIG. 2A is a flow diagram of a method of relating application performance to network events, in accordance with some embodiments of the present disclosure.

FIG. 2A is a flow diagram of a method 200 of detecting the impact of network events on application performance, in accordance with some embodiments of the present disclosure. Method 200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 200 may be performed by a computing device (e.g., computing device 130C executing modules 132A-C illustrated in FIG. 1A). It should be appreciated that the actions of the method 200 in FIG. 2A can be performed in differing orders, groupings, or subsets than shown in FIG. 2A, for various purposes or user preferences.

The method 200 begins at block 205 where the processing logic determines a physical topology of the network and monitors network events. The processing logic may obtain control and management plane data from one or more devices in the network (e.g., router 110A in FIG. 1A) and utilize the control and management plane data to determine the physical topology as well as monitor network events. Processing logic may also keep historical data including a history of network state, configurations, and software changes for use in predicting drops in performance of an application, as discussed in further detail herein. At block 210, the processing logic may monitor the performance of each application running in the network. Processing logic may obtain data logs, requests and related application calls initiated by each of the applications and at block 215, may use such data to build a map of the applications running on the network and the network segments where the data flow for each application is processed. For each request obtained, the processing logic may build a call graph indicating the application calls required to service the request. As used herein, a request may itself be an application call that refers to an overarching request for data and involves a number of application calls (or stated different, sub-application calls) to process the request. For example, a request issued by a source device on the network for loading a web page from a destination device on the network may involve multiple application calls to other applications on the source device as well as application calls to other destination devices on the network. Each application call may indicate the IP addresses of the source and destination devices of the call. Each application call may also have a beginning and end time stamp and indicate the time taken for the call to complete. The processing logic may utilize this data to determine the flow of data through the network for that particular application, thereby indicating a segment of the network where data for that application flows and is processed.

Figure 3:
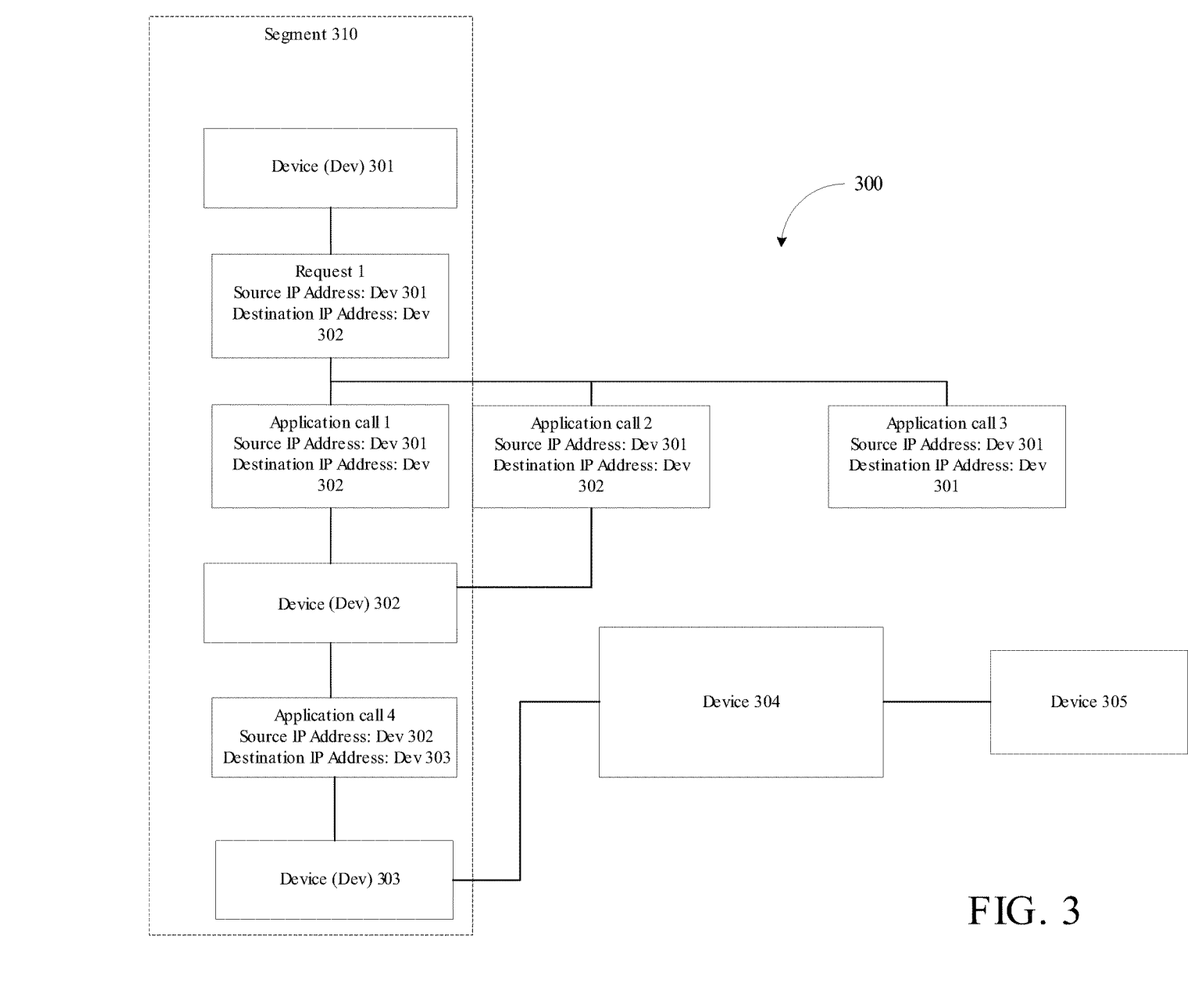
FIG. 3 shows an example call graph mapped to a network topology, in accordance with some embodiments of the present disclosure.

FIG. 3 illustrates a call graph 300 mapped onto a sample network topology, in accordance with some embodiments of the present disclosure. Call graph 300 may illustrate the flow of data for an application's request for data (and any related application calls) mapped to devices 301-305, which may be the devices in a network, or data center. An application on device 301 may initiate a request (Request 1) which may represent a request for data. For example, the application on device 301 may wish to load a web page from a site hosted on device 302. Thus, request 1 may indicate the IP addresses of the source and destination devices of the request as the IP addresses of device 301 and 302, respectively. In order to complete the request, request 1 may issue application calls 1-4. Each of application calls 1-4 may represent a different function. For example, application call 1 may represent a call to a database running on device 302 for data. Application call 2 may be a call to an authentication function also running on device 302. Application call 3 may be a call to another application running on device 301 from which data is required to display the web page properly. Application call 4 may represent a call to a database running on device 303, in a situation where the data requested by application call 1 is not available, or is not available in its entirety on device 302. Each application call may indicate the IP address of its source and destination device, as well as the time taken to complete the call and a time stamp for the call. Upon obtaining all of the application calls, the processing logic may map each call to the segment of the physical topology where the data flow for that particular application is processed based on the IP addresses of the source and destination devices of each application call 1-4. As shown in FIG. 3, segment 310 represents the segment of the network where the data flow for this application is processed. FIG. 3 also indicates which devices/nodes each application call in request 1 is processed by (e.g., a source and destination device of the application call), thereby providing a fine-grained level of specificity when mapping application calls to the physical topology of the network. In this way, the processing logic can observe network events occurring on the exact devices that a particular application call operates between as well as the segment of the network where data for the application as a whole is processed, as discussed in further detail herein.

Referring back to FIG. 2A, at block 220, the processing logic may detect a drop in performance of an application. In some embodiments, the drop in performance of an application may refer to a drop that occurred previously and is detected from the stored application performance and network topology data. The processing logic (executing application monitoring system 132B, for example) may specify criteria regarding the length of time required for a request (and each related application call) to complete. In some embodiments, the criteria may be adjusted based on hop by hop latency of the network, as discussed in further detail herein. Thus, if the request or an application call takes longer than specified by the criteria, this may correspond to a drop in performance of the application. In some embodiments, the criteria may also include a maximum number of retries allowed by a request and each related application call. If a request or application call retries more than the maximum number of retries, this may also correspond to a drop in performance. If there has been a drop in performance, then at block 225, the processing logic may determine one or more network events that are a cause of the drop in performance. The processing logic may determine the segment of the network that the application data flow is processed in, as discussed above, and may identify network events occurring on nodes within that segment. More specifically, the processing logic may use the application call graph (as discussed above) to determine exactly where in the application call hierarchy (i.e., one or more particular application calls) the drop in performance occurred, and identify nodes associated with those particular sub calls (e.g., the source and destination nodes of that application call). For example, the processing logic may identify the nodes indicated as the source and destination nodes for that application call (based on the IP addresses indicated in the application call) and correlate network events occurring on those nodes with the drop in performance. In some embodiments, the processing logic may identify network events occurring a threshold amount of time before the beginning time stamp of the application call(s) corresponding to the drop in performance and correlate those events with the drop in performance. The processing logic may also utilize in-band network telemetry data (also collected from the router by, e.g., module 132A), which may provide information regarding hop by hop latency on a per-flow basis (i.e., for each of the application calls). The hop by hop latency information may indicate the latency on the data flow path/network segment seen as a result of general network conditions. Some of these general network conditions include latency on the link, errors on the link, congestion on the link and disruptive changes that temporarily make the network unreachable (e.g., routing reconvergence, link failure and reconvergence). In some embodiments, the processing logic may adjust for a standard amount of latency introduced by general network conditions when determining one or more network events that are a cause of a drop in application performance. For example, the processing logic may determine that the completion time of an application call must exceed the alloted time by a threshold amount, to ensure that the delay is a result of a particular network event having a greater impact on performance than general network conditions. In some embodiments, the processing logic may adjust the allotted time to complete an application call based on the latency introduced by general network conditions as indicated by the in-band network telemetry data. The processing logic may, alternatively or in addition to in-band telemetry data, collect other similar types of data from the router 110a such as internet protocol flow information export (IPFIX) and sampled flow (sFlow) data to provide a more accurate picture of data flow through the network.

At block 230, the processing logic may perform one or more actions to remedy the drop in performance. Initially, the processing logic may issue an alert to the user indicating that there has been a drop in performance for a certain application, and also indicating the one or more network events determined as causes for the drop in performance. In addition, the processing logic may perform a remedial action based on the detected cause of the drop in performance (i.e., based on the network events determined as being a cause of the drop in performance). For example, the processing logic may determine that congestion events caused by bursts of heavy traffic are the cause of the drop and utilize different queuing strategies or quality of service schemes to give the application a higher priority. Alternatively, or in addition, the processing logic may allocate more bandwidth to that application. In some embodiments, the processing logic may schedule workloads for the application so as to avoid the application attempting to communicate on an already-congested link.

In other embodiments, the processing logic may determine that a configuration change event (e.g., an intended change occurring as a result of adding a virtual tunneling endpoint to the network) is the cause and may perform an auto rollback of the configuration change. In other embodiments, the processing logic may determine that a link is down (e.g., an unintentional change made to the network), and implement traffic engineering protocols to steer data processing away from congested parts of the network or change hashing algorithms. In another example, the processing logic may determine that an unusually high amount of congestion caused by application collision is the cause for a drop in performance, determine which applications are colliding, and steer them in different directions to avoid congestion. This can occur as an unintended result of an intentional change in the network. For example, if a high bandwidth application is running, and a number of other high bandwidth applications are then scheduled, this may affect the performance of all the applications. In addition, if the processing logic is scheduling a new application, processing logic may utilize the network topology to determine high congestion areas and determine an appropriate network segment/node to schedule the application on, as other network segments may already be experiencing high congestion.

In some embodiments, the processing logic may store data corresponding to network events that impact application performance. For example, the processing logic may store each drop in the performance of an application, as well as the network events identified as a determined cause of the drop in performance. The processing logic may utilize a machine learning algorithm to detect patterns in the performance of an application as related to network events. For example, the processing logic may determine that network congestion increases in a particular segment of the network topology when a particular application runs in that particular segment and determine that the application is too bandwidth-intensive to run with all of the other applications in that segment. Thus, the processing logic may schedule that particular application on other segments of the network so as to avoid this problem. In a similar manner, the processing logic may determine other patterns relating to network events that cause drops in the performance of an application, and upon detecting that such network events may be imminent, may take action to avoid the resulting drop in performance caused by those events.

Figure 2B:
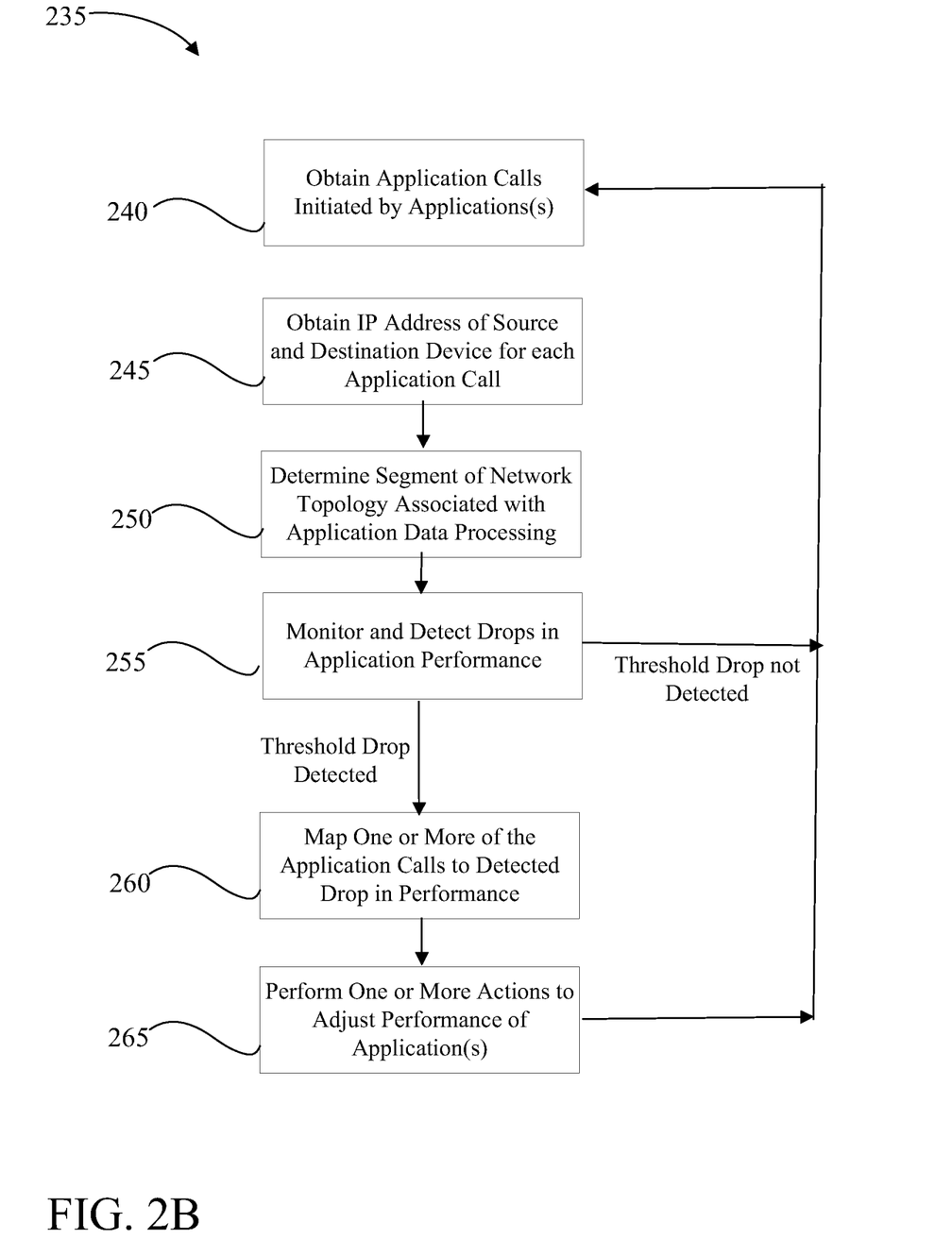
FIG. 2B is a flow diagram of a method for monitoring performance of an application, in accordance with some embodiments of the present disclosure.

FIG. 2B is a flow diagram of a method 235 for monitoring performance of an application, in accordance with some embodiments of the present disclosure. Method 235 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 235 may be performed by a computing device (e.g., computing device 130C executing modules 132A-C illustrated in FIG. 1A). It should be appreciated that the actions of the method 235 in FIG. 2B can be performed in various orders, groupings, or subsets different from those shown in FIG. 2B, for various purposes or user preferences.

Method 235 begins at block 240, where the processing logic obtains a set of application calls initiated by an application. At block 245, the processing logic obtains an IP address of a source and destination device for each of the set of application calls. At block 250, the processing logic may determine a segment of the network topology where processing of data for the application is based, at least in part, on the IP address of the source and destination devices for each of the set of application calls. At block 255, processing logic monitors the network for drops in performance such as further described herein. Processing logic may further determine that the drop in performance exceeds a particular threshold level and, in response to exceeding the threshold, further maps the set of application calls to the detected drop at block 260. Based upon the mapping, processing logic performs one or more actions (e.g., reallocating application resources and/or priorities such as described further herein) at block 265 for adjusting the performance of the applications associated with the mapped application calls. After adjusting performance, or if no performance drop threshold is exceeded, processing logic returns to block 240 in order to further monitor performance and, if called for, adjust performance through method 235.

Figure 4:
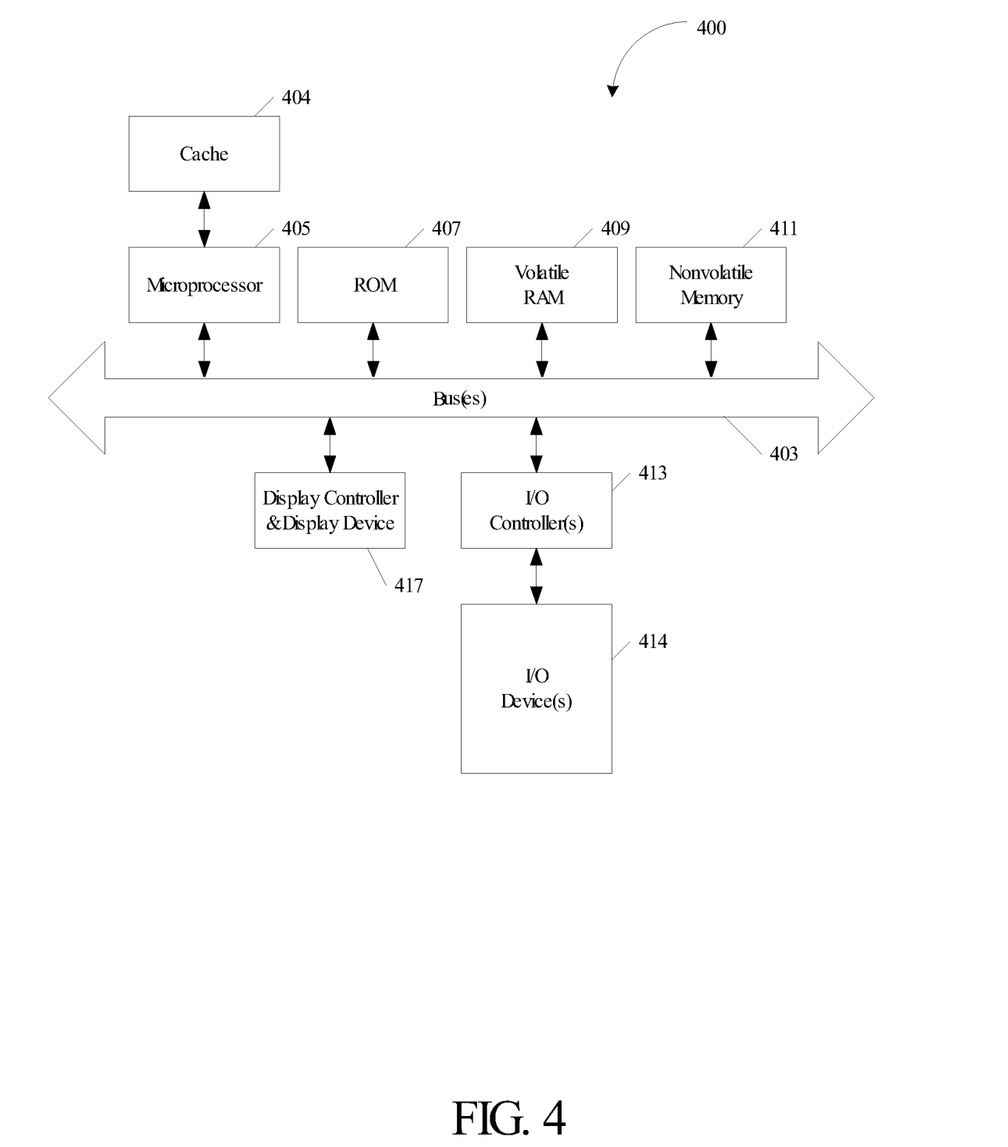
FIG. 4 is a block diagram of one embodiment of an exemplary network device, in accordance with some embodiments of the present disclosure.

FIG. 4 shows an example computing device 400, in accordance with some embodiments of the present disclosure. For example, the computing device 400 may be implemented including a network device 100 as shown in FIG. 1. Note that while FIG. 4 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 4, the computing device 400, which is a form of a data processing system, includes a bus 403, which is coupled to a microprocessor(s) 405, and a ROM (Read Only Memory) 407, a volatile RAM 409, and a non-volatile memory 411. The microprocessor 405 may retrieve the instructions from the memories 407, 409, 411 and execute the instructions to perform operations described above. The bus 403 interconnects these various components together and also interconnects these components 405, 407, 409, and 411 to a display controller and display device 417 and to peripheral devices such as input/output (I/O) devices which may be mice, keyboards, modems, network interfaces, printers and other devices that are well known in the art. In one embodiment, the computing device 400 includes a plurality of network interfaces of the same or different types (e.g., ethernet copper interface, Ethernet fiber interfaces, wireless, and/or other types of network interfaces). In this embodiment, the computing device 400 can include a forwarding engine to forward network data received on one interface out another interface.

Typically, the input/output devices 415 are coupled to the system through input/output controllers 413. The volatile RAM 409 is typically implemented as dynamic RAM (DRAM), which requires power continually in order to refresh or maintain the data in the memory.

The nonvolatile memory 411 is typically a mass storage device such as a magnetic hard drive, magnetic optical drive, an optical drive, a DVD ROM/RAM, a flash memory, or other types of memory systems, which maintain data (e.g., large amounts of data) even after power is removed from the system. Typically, the memory 411 will also operate as RAM does, although this is not required. While FIG. 4 shows that the mass storage 411 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 403 may include one or more buses connected to each other through various bridges, controllers, and/or adapters that are well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor-specific instructions (e.g., an abstract execution environment such as a "process virtual machine" (e.g., a Java virtual machine), an interpreter, a common language runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

Detailed illustrative embodiments are disclosed herein. However, specific functional details disclosed herein are merely representative for purposes of describing embodiments. Embodiments may be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc., may be used herein to describe various steps or calculations, these steps or calculations should not be limited by these terms. These terms may be used to distinguish one step or calculation from another. For example, a first calculation could be termed a second calculation, and, similarly, a second step could be termed a first step, without departing from the scope of this disclosure. As used herein, the term "and/or" and the "/" symbol include any and all combinations of one or more of the associated listed items.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two blocks in a figure shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer-readable code on a tangible non-transitory computer-readable medium. The computer-readable medium is any data storage device that can store data that can be thereafter read by a computer system. Examples of computer readable media include hard drives, network-attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times, or the described operations may be distributed in a system that allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, unprogrammed generic computer, an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and their practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for improving performance in network applications and network processing, the method comprising:
   determining a physical topology of a network based upon control plane information received from one or more devices in the network;
   detecting network events that are based, at least in part, on the determined physical topology;
   monitoring, for each of a plurality of applications running on the network, performance of the application based, at least in part, on a set of application calls initiated by the application;
   detecting a drop in performance of an application running within the network based on one or more application calls of the set of application calls; and
   identifying, as a result of detecting the drop in performance, that the drop in performance does not correspond to the network events occurring before the drop in performance.

2. The method of claim 1, further comprising:
   receiving, from a network device in the network, application data that includes information regarding a set of application calls initiated by an application running on the network.

3. The method of claim 1, wherein the monitoring comprises:
   obtaining the set of application calls initiated by the application;
   obtaining an internet protocol (IP) address of a source device and an IP address of a destination device for each of the set of application calls; and
   determining a segment of the determined network topology where data for the application is processed based, at least in part, on the IP address of the source and destination devices for each of the set of application calls.

4. The method of claim 3, wherein detecting a drop in performance comprises detecting that a completion time for each of one or more of the set of application calls initiated by the application was above a threshold time.

5. The method of claim 4, wherein the completion time for each of the one or more application calls is adjusted based on a hop-by-hop latency of the network.

6. The method of claim 1, further comprising performing a remedial action to adjust the performance of the application based on a determined cause of a change in performance.

7. The method of claim 6, further comprising:
   correlating the drop in performance with one or more of the remedial action and general network conditions.

8. One or more non-transitory computer-readable media storing computer-executable instructions that, when executed by a processor, perform a method of improving performance in network applications and network processing, the method comprising:
   determining a physical topology of a network based upon control plane information received from one or more devices in the network;
   detecting network events that are based, at least in part, on the determined physical topology;
   monitoring, for each of a plurality of applications running on the network, performance of the application based, at least in part, on a set of application calls initiated by the application;
   detecting a drop in performance of an application running within the network based on one or more application calls of the set of application calls; and
   identifying, as a result of detecting the drop in performance, that the drop in performance does not correspond to the network events occurring before the drop in performance.

9. The one or more non-transitory computer-readable media of claim 8, wherein the method further comprises:
   receiving, from a network device in the network, application data that includes information regarding a set of application calls initiated by an application running on the network.

10. The one or more non-transitory computer-readable media of claim 8, wherein the monitoring comprises:
    obtaining the set of application calls initiated by the application;
    obtaining an internet protocol (IP) address of a source device and an IP address of a destination device for each of the set of application calls; and
    determining a segment of the determined network topology where data for the application is processed based, at least in part, on the IP address of the source and destination devices for each of the set of application calls.

11. The one or more non-transitory computer-readable media of claim 10, wherein detecting a drop in performance comprises detecting that a completion time for each of one or more of the set of application calls initiated by the application was above a threshold time.

12. The one or more non-transitory computer-readable media of claim 11, wherein the completion time for each of the one or more application calls is adjusted based on a hop-by-hop latency of the network.

13. The one or more non-transitory computer-readable media of claim 8, further comprising performing a remedial action to adjust the performance of the application based on a determined cause of a change in performance.

14. The one or more non-transitory computer-readable media of claim 13, further comprising:
    correlating the drop in performance with one or more of the remedial action and general network conditions.

15. A network device comprising:
    a memory; and
    a processing device coupled to the memory, the processing device configured to:

determine a physical topology of a network based upon control plane information received from one or more devices in the network;

detect network events that are based, at least in part, on the determined physical topology;

monitor, for each of a plurality of applications running on the network, performance of the application based, at least in part, on a set of application calls initiated by the application;

detect a drop in performance of an application running within the network based on one or more application calls of the set of application calls; and identify, as a result of detecting the drop in performance, that the drop in performance does not correspond to the network events occurring before the drop in performance.

16. The network device of claim 15, wherein the processing device is further configured to:

receive, from a network device in the network, application data that includes information regarding a set of application calls initiated by an application running on the network.

17. The network device of claim 15, wherein to monitor performance, the processing device is further configured to:

obtain the set of application calls initiated by the application;

obtain an internet protocol (IP) address of a source device and an IP address of a destination device of each of the set of application calls; and determine a segment of the determined network topology where data for the application is processed based, at least in part, on the IP address of the source and destination devices for each of the set of application calls.

18. The network device of claim 17, wherein to detect a drop in performance, the processing device is further configured to detect that a completion time for each of one or more of the set of application calls initiated by the application was above a threshold time.

19. The network device of claim 15, wherein the processing device is further configured to:

store data corresponding to the detected drop in performance and the one or more detected network events in a database; and utilize a machine learning algorithm to detect patterns in a behavior of the application based, at least in part, on the stored data.

20. The network device of claim 19, wherein the processing device is further configured to utilize the detected patterns to predict drops in performance of the application.

* * * * *